June 7, 1960 B. J. MILLER 2,939,916

WAVE-SIGNAL TRANSLATING CIRCUITS

Filed Feb. 7, 1956 2 Sheets-Sheet 1

BERTRAND J. MILLER
*INVENTOR.*

BY John J. Pederson

HIS ATTORNEY.

June 7, 1960 B. J. MILLER 2,939,916
WAVE-SIGNAL TRANSLATING CIRCUITS
Filed Feb. 7, 1956 2 Sheets-Sheet 2

BERTRAND J. MILLER
*INVENTOR.*

BY John J. Pederson

HIS ATTORNEY.

United States Patent Office 2,939,916

Patented June 7, 1960

2,939,916

WAVE-SIGNAL TRANSLATING CIRCUITS

Bertrand J. Miller, Oak Park, Ill., assignor to Zenith Radio Corporation, a corporation of Delaware Filed Feb. 7, 1956, Ser. No. 564,046

5 Claims. (Cl. 179—1.5)

This invention relates generally to wave-signal translating circuits and more particularly to such circuits comprising semi-conductor signal translating devices.

The field of solid state electronics is of relatively recent origin and has given rise to a new terminology herein reviewed in the interest of clarifying the structural and functional aspects of the invention. A semi-conductor, for example, germanium, in its refined (intrinsic) state is for all practical purposes an insulator, but the nature of a semi-conductor is such that the addition of sufficient traces of impurities radically affects its conduction properties. Two classes of impurities, designated as "acceptors" and "donors," are of interest; they are found in the third and fifth groups respectively of the periodic table. When the germanium structure is interspersed with traces of an acceptor impurity the result is a creation of positive charges or "holes." A semi-conductor containing traces of an acceptor impurity is designated as p-type conductivity material since it is amenable to p-type conduction, i.e., conduction through migration of positive charges. Contrariwise, addition of donor elements results in a surplus of negative charges in the crystal. A semi-conductor in which a donor impurity predominates is said to be composed of n-type material, it being disposed to n-type conduction, that is, conduction through migration of negative charges.

This invention is concerned with a switching or sampling circuit utilizing a semi-conductor signal translating device instead of the more conventional electron-discharge device. In an electron tube switching arrangement, gating action is accomplished by application of an actuating signal to a control electrode which renders the tube alternately conductive and non-conductive. Inherently, this switching action produces voltage surges in the output signal whenever an inductive output circuit is employed. These voltage transients, which are discernable whenever the tube is driven into the conductive state, are insignificant in many applications but are highly objectionable in others, particularly in audio circuits, wherein the transient itself may be audibly reproduced.

There are many applications for switching circuits which require a high degree of freedom from switching transients; one such application is in the field of subscription broadcasting, in which audio or other information may be transmitted in the form of a signal periodically inverted in phase to preclude intelligible reproduction by ordinary means. It is frequently convenient, particularly in a subscription television system, to accomplish these phase inversions at a rate within the audio frequency spectrum, in which case switching-rate voltage transients introduced into the signal at either the transmitter or the receiver are exceptionally objectionable. In addition, the transient pulses which may be introduced into the signal at the transmitter constitute a key to the sequence in which the signal has been coded and are therefore undesirable in that they may be utilized for unauthorized reproduction of the program. Signal-translating circuits constructed in accordance with the invention are particularly valuable in a secrecy-transmission system of this type, although not restricted in utility to such a system; accordingly, the invention is described hereinafter in conjunction with a secrecy communication system. In this connection, it should be noted that the invention is equally applicable to the original phase-inverter or coding device utilized at the secrecy-communication transmitter and to the supplementary decoding system reequired at the receiver to reconstitute the original signal.

Switching circuits employing semi-conductor devices have been known for some time, but these known circuits have predicated their switching action upon control of electric current flow through a rectifying barrier intermediate two contiguous zones of semi-conductive material of opposite conductivity. This switching action is generally accomplished by alternately biasing the two zones to permit or to prohibit electric current flow from one conductivity zone to its opposite counterpart, in a manner strictly analogous to the "source" and "sink" concept of vacuum tube circuitry. Understandably, a semi-conductor switch of this type generates the same undesirable transient components as a vacuum tube circuit.

A principal object of the invention, therefore, is to provide a new and improved wave-signal translating circuit of the type comprising a semi-conductor device which avoids one or more of the above-noted disadvantages of prior art circuits.

Another object of the invention is to provide an electronic switching circuit in which the generation of undesirable transient components is inherently minimized.

It is a further object of the invention to provide an encoding circuit adapted to develop an encoded signal substantially free from transient distortion.

A wave-signal translating circuit constructed in accordance with the invention comprises a signal-translating device including a continuous crystal of semi-conductor material of a first predetermined conductivity type (e.g., n-type or p-type), a pair of spaced electrodes in ohmic contact with the crystal, and a control electrode. The control electrode comprises a body of semi-conductor material of a different conductivity type (e.g., p-type or n-type) adjacent the crystal in rectifying contact therewith at a location intermediate the spaced electrodes. Means are provided for applying a signal wave between the spaced electrodes, and this signal-input means includes means for maintaining the spaced electrodes at a common direct-current potential. The circuit further includes means for varying the potential of the control electrode with respect to the common direct-current potential to vary the conductivity of the crystal while avoiding the generation of undesirable transient signal components. Utilization means are coupled to the spaced electrodes.

The features of the invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

Figure 1:
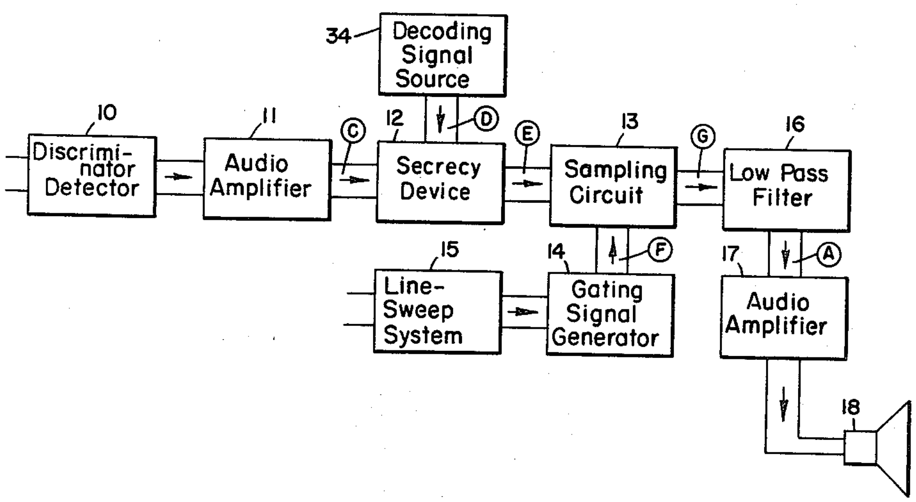
Figure 1 is a block diagram of the audio portion of a subscription television receiver.

Figure 1 illustrates the audio decoding portion of a subscription television receiver of a type described in the copending application, Serial No. 397,176, filed December 9, 1953, in the name of Howard K. Van Jepmond and assigned to the present assignee. The audio decoding system shown in Figure 1 comprises a conventional discriminator detector circuit 10 that abstracts a coded audio intelligence signal from a received subscription telecast; the coded audio output signal from detector 10 is applied to an audio amplifier 11. The amplified signal from circuit 11 is channeled to a secrecy device 12 which phase-inverts selected portions of the coded audio signal as a function of a decoding signal derived from an appropriate source 34 to develop a decoded signal generally representative of the original intelligence. This reconstituted audio signal is applied to one pair of input terminals of a sampling or gating circuit 13. Sampling circuit 13 is also coupled to a gating signal generator 14 which supplies a high-frequency gating signal to the sampling circuit; in the receiver described in the aforementioned Van Jepmond application, the gating signal generator comprises a harmonic generator driven from the line-sweep system 15 of the television receiver. The output of sampling circuit 13 is coupled to an envelope detection device comprising a low-pass filter 16 and the audio signal is thereafter amplified in an audio amplifier 17 and employed to drive a loudspeaker 18.

Figure 2:
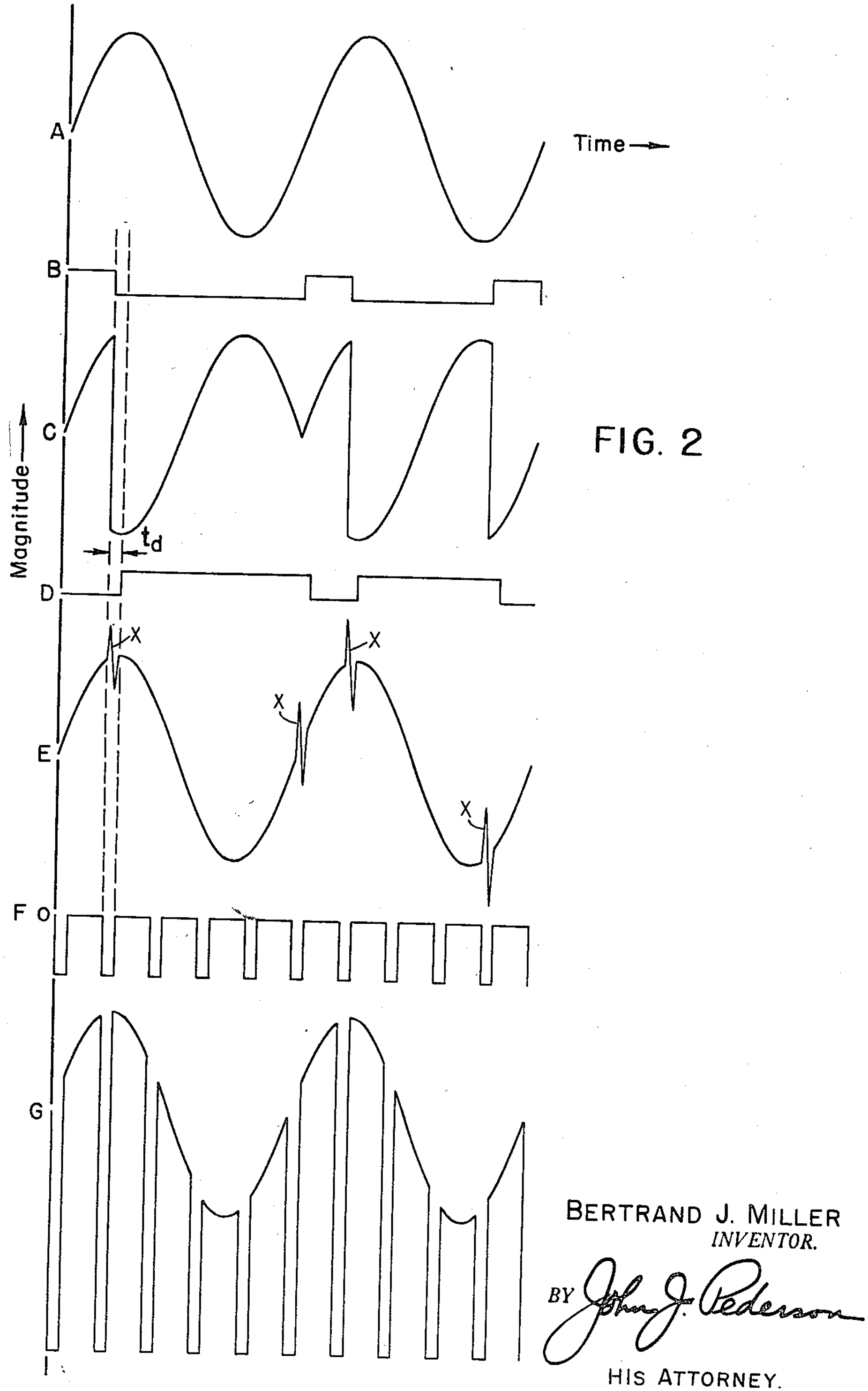
Figure 2 is a series of curves illustrative of the waveforms of the signals appearing at various points in the apparatus of Figures 1 and 3.

The operation of the audio decoding system shown in Figure 1 can best be understood by means of the waveforms of Figure 2, which illustrate the different actuating and intelligence signals occurring at various points in the audio decoding system. For further convenience, the individual portions of Figure 1 have been identified with the curves of Figure 2 which correspond to particular signals in the decoding system. Curve A of Figure 2 represents an audio intelligence signal to be coded at a subscription transmitter and reconstituted in the audio decoding system of Figure 1. In the system described in the aforementioned Van Jepmond application, signal A is periodically inverted in phase in accordance with a coding schedule which may be of random character; curve B of Figure 2 illustrates a typical coding signal employed for this purpose. With this type of phase-inversion coding, the received audio signal developed in discriminator detector 10 and translated through amplifier 11 has a waveform corresponding to that illustrated by curve C of Figure 2. A decoding signal derived from decoding signal source 34, illustrated by curve D, is utilized in secrecy device 12 to phase-invert selected portions of the received audio signal (curve C) to reconstitute the original audio information. In general, curve D corresponds to curve B but is of opposite polarity; however, it is not generally possible to obtain perfect time coincidence between the transmitter and receiver encoding apparatus, so that there is usually a relatively small but nonetheless important time displacement between coding signal B and decoding signal D, as indicated in Figure 2 by time increment $t_d$. This lack of time coincidence causes the occurrence of transient peaks X in the reconstituted audio signal, illustrated by curve E, which is developed at the output of secrecy device 12 (Figure 1).

Direct use of the reconstituted audio signal E in the system of Figure 1 would produce serious and substantial audio distortion in the reproduced sound. In order to obviate this difficulty, as described and claimed in the above-noted copending Van Jepmond application, the sampling circuit 13 is provided as a means of eliminating the undesired transient voltages X. Because phase inversions in the proposed system occur during line-retrace intervals in the telecast, the undesired transient pulses represent a random function of the line-sweep frequency. Accordingly, the Van Jepmond system provides for sampling of the reconstituted audio signal at a frequency which is a harmonic of the line-scanning frequency; the sampling or gating signal developed by circuits 14 and 15 is illustrated in curve F of Figure 2. The gating signal of curve F actuates sampling circuit 13 to sample the encoded audio signal only during intervals excluding phase inversion intervals and develop in the output circuit of the sampler a signal illustrated by curve G. It is this signal which is supplied to the envelope-detection device, low-pass filter 16, which reconstitutes the encoded audio signal from the sampled signal; the output signal from the low-pass filter is substantially free of transient voltages and corresponds to the original audio intelligence signal of curve A.

In the Van Jepmond application, sampling circuit 13 comprises a vacuum-tube gating circuit of relatively conventional form; it is this particular unit of the audio decoding system with which the present invention is concerned. More specifically, the invention provides a semi-conductor device and sampling circuit which may be directly substituted for the vacuum tube arrangement described in the Van Jepmond application. This novel sampling circuit eliminates any necessity for high voltage D.C. power supplies and inherently avoids any possibility that the sampling circuit will itself introduce any undesirable transients into the signal translated to the audio reproduction system.

Figure 3:
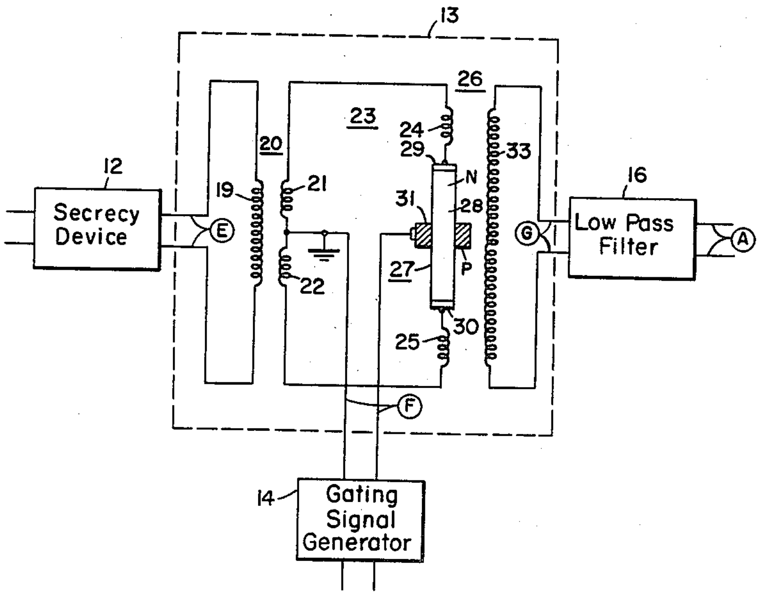
Figure 3 is a schematic diagram of a wave-signal translating circuit constructed in accordance with the invention.

Figure 3 illustrates one embodiment of the invention suitable for use as the sampling circuit 13 of Figure 1. The output stage of secrecy device 12 is coupled to the primary winding 19 of an input transformer 20 included within the sampling circuit 13. The secondary winding of transformer 20 comprises two sections 21 and 22, the electrical center of the secondary being grounded. Secondary winding 21, 22 is included in a loop circuit 23 which further comprises the split primary winding 24, 25 of an output transformer 26, a semi-conductor gating device 27 being connected in series between primary winding sections 24 and 25.

Semi-conductor gating device 27, which is known per se as a "field effect transistor," comprises an elongated single-crystal body 28 of semi-conductor material, usually germanium or silicon, and a pair of signal-translating electrodes 29, 30 in ohmic contact with crystal 28 at or near its extremities. A control electrode 31 is included in device 27; the control electrode comprises a ring of semi-conductor material encircling crystal 28 in rectifying contact therewith at a location intermediate and preferably equi-distance from signal-translating electrodes 29 and 30. Elements 28 and 31 of device 27 may be of n-type or p-type conductivity, but must be of opposite types; in the illustrated embodiment, crystal body 28 comprises n-type material and control electrode 31 is of p-type material. Control electrode 31 is electrically connected to sampling signal generator 14 (see Figure 1). The secondary winding 33 of output transformer 26 is coupled to the envelope detector, low-pass filter 16, as indicated in Figure 1.

The operation of semi-conductor device 27 is predicated upon the barrier zone concept of solid state electronics; the novelty of the invention lies in the manner of utilizing the barrier zone to control the flow of majority carriers through elongated crystal 28 of semi-conductor device 27. This objective is realized by impressing negative sampling voltage pulses upon the control electrode comprising semi-conductor segment 31. Electrode 31, composed of p-type conductivity material, completely surrounds the elongated body of n-type material and is in rectifying contact therewith, so that application of a negative voltage to the control electrode operates to prevent conduction through crystal 28. Elements 28 and 31 in combination then comprise a barrier zone midway between ohmic contacts 29 and 30.

In the absence of an actuating signal, i.e., with zero voltage on control electrode 31, the majority carriers in the n-type germanium crystal bar provide conduction whenever a signal voltage appears across ohmic contacts 29, 30. It is to be noted that the customary "source" and "sink" concept of vacuum tube circuit theory finds no counterpart in this semi-conductor device, since there are no actuating D.-C. currents or voltages present within loop 23.

Disassociating crystal 28 from its p-type control mechanism 31, the bar is seen to represent a resistance, the magnitude of which is determined by the quantity and distribution of significant impurities in the semiconductor. When positive and negative voltages are applied to elements 28 and 31 respectively, there is no electric current conduction between them since the device is biased in the reverse direction. This phenomenon is occasioned by the creation, in each of the crystals, of a region so devoid of carriers that a quantity of material in each crystal contiguous to the barrier reaches a condition of extremely high resistance.

The application of a negative-going sampling voltage wave (curve F, Figure 2) developed by harmonic generator 14 to control segment 31 operates effectively to "constrict" the dispersion of majority carriers (electrons) in the region encompassed by the control electrode so that this portion of crystal 28 represents an extremely high resistance insofar as the marjority carriers are concerned. This "constriction"—the intrinsic region—serves to increase the effective resistivity of crystal 28 to current conduction with control segment 31 in the role of gating electrode. Elongated crystal 28 therefore constitutes a controllable resistor which can be made to present a low or high impedance to an electric wave signal. It is to be noted that such impedance control is accomplished without introducing any D.-C. currents into signal loop 23, thereby avoiding the problem of transient surges associated with conventional electron-discharge devices wherein repetitive interruptions of current through the electron discharge device frequently produce objectionable transient pulses.

Operation of the sampling circuit illustrated in Figure 3 is such as to prevent conduction through crystal 28 during intervals determined by the application of negative pulses at a rate determined by the line-sweep system 15 in conjunction with the gating signal generator 14, which may comprise a simple harmonic generator. Generator 14 is so designed as to produce negative pulses of sufficient magnitude to prevent conduction through crystal 28. Harmonic generator 14 is utilized as a free-running device synchronized by the line-sweep system 15 to actuate control electrode 31 to its "off" condition periodically, including all transient pulse intervals which are ordinarily a random function of the line-sweep frequency.

The sampling circuit of Figure 3 is effective and efficient in avoiding the transient-pulse distortion difficulties frequently associated with vacuum tubes and with more conventional semi-conductor devices. The circuit is extremely simple and the semi-conductor device employed is of relatively simple and economical construction. The operating economies of semi-conductor devices are thus fully realized without undue original-equipment expense. Of course, the invention is not limited to a subscription-communication system; rather, it is useful and valuable in any switching or gating application where elimination of transients is desired.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. In combination: a signal translating device comprising a continuous crystal of semi-conductive material of a first predetermined conductivity type, a pair of spaced electrodes in ohmic contact with said crystal, and a control electrode including a body of semi-conductive material of a different conductivity type adjacent said crystal in rectifying contact therewith at a location intermediate said spaced electrodes; means, including means for maintaining said spaced electrodes at a common direct-current potential, for applying a signal wave between said spaced electrodes; means for varying the potential of said control electrode with respect to said common direct-current potential to vary the conductivity of said semi-conductive crystal while avoiding the generation of undesirable transient signal components; and signal utilization means coupled to said spaced electrodes.

2. In combination: a signal translating device comprising an elongated continuous crystal of semi-conductive material of a first predetermined conductivity type, a pair of spaced electrodes in ohmic contact with opposite ends of said crystal, and a control electrode including a body of semi-conductive material of a different conductivity type encircling said crystal in rectifying contact therewith at a location equidistant from said spaced electrodes; means, including means for maintaining said spaced electrodes at a common direct-current potential, for applying a signal wave between said spaced electrodes; means for varying the potential of said control electrode with respect to said common direct-current potential to vary the conductivity of said semi-conductive crystal while avoiding the generation of undesirable transient signal components; and signal utilization means coupled to said spaced electrodes.

3. A wave-signal translating circuit comprising: an input transformer including primary and secondary windings, the electrical center of said secondary winding being connected to a plane of reference potential; an output transformer including a split primary winding connected across said secondary winding of said input transformer; a signal translating device comprising an elongated semi-conductive crystal of predetermined conductivity type, a pair of spaced electrodes in ohmic contact with said crystal, said electrodes being connected between sections of said output transformer primary, and a control electrode comprising a body of semi-conductive material of a different conductivity type encircling said crystal in rectifying contact therewith at a location intermediate said spaced electrodes; and means for applying a control signal to said control electrode to vary the effective conductivity of said crystal.

4. A secrecy-communication system for translating an information signal comprising: a secrecy device for varying a characteristic of said information signal at selected times in accordance with a predetermined code schedule to develop a modified intelligence signal having transitions at said selected times which tend to introduce undesired distortion in said modified intelligence signal; a wave signal translating circuit comprising a continuous crystal of semi-conductive material of a first predetermined conductivity type, a pair of spaced electrodes in ohmic contact with said crystal, a control electrode including a body of semi-conductive material of a different conductivity type encircling said crystal in rectifying contact therewith at a location intermediate said spaced electrodes, means coupled to said secrecy device for applying said modified intelligence signal between said spaced electrodes, and means for maintaining said spaced electrodes at a common direct-current potential; and means for varying the potential of said control electrode with respect to said direct-current potential to effectuate sampling of said modified intelligence signal only at times other than said selected times to develop in said signal translating circuit an output signal that is a substantial simulation of said modified intelligence signal except that the undesired distortion is removed.

5. In a secrecy-communication receiver for utilizing an information signal transmitted with predetermined portions inverted in phase with respect to the remaining portions thereof, a decoding system comprising: a decoding device for decoding said information signal by phase-inverting selected portions of said signal with respect to other portions thereof in accordance with a predetermined encoding schedule to develop a decoded information signal; a signal translating device comprising an elongated continuous crystal of semi-conductive material of a first predetermined conductivity type, a pair of spaced electrodes in ohmic contact with opposite ends of said crystal, and a control electrode comprising a ring of semiconductive material of a different conductivity type encircling said crystal in rectifying contact therewith at a location approximately equidistant from said spaced electrodes; means coupled to said decoding device and to said signal translating device for applying said decoded information signal between said spaced electrodes, said means including means for maintaining said spaced electrodes at a common direct-current potential; means for applying a gating signal to said control electrode to vary the potential of said control electrode with respect to said common direct-current potential to effectuate sampling of said decoded information signal only during intervals excluding phase inversions between said selected portions and said other portions, said gating signal having a repetition frequency substantially higher than the maximum repetition frequency of phase inversion changes of said encoding schedule; an envelope detector coupled to said spaced electrodes for reconstituting said encoded information signal free of undesirable transient signal components; and signal utilization means coupled to said envelope detector.

References Cited in the file of this patent

UNITED STATES PATENTS

| | | |
|---|---|---|
| 2,694,104 | Druz | Nov. 9, 1954 |
| 2,709,787 | Kircher | May 31, 1955 |
| 2,763,832 | Shockley | Sept. 18, 1956 |